United States Patent [19]
Lockwood

[11] 3,771,620
[45] Nov. 13, 1973

[54] VAPORIFIC DAMAGE MEASUREMENT ARENA

[75] Inventor: Donald W. Lockwood, China Lake, Calif.

[73] Assignee: The United States of America as represented by the Secretary of the Navy, Washington, D.C.

[22] Filed: Feb. 10, 1971

[21] Appl. No.: 114,345

[52] U.S. Cl.............. 181/.5 NP, 73/167, 181/.5 R
[51] Int. Cl. ............................................. G01l 5/14
[58] Field of Search .................. 73/167; 181/.5 EC, 181/.5 NP, .5 R

[56] References Cited
UNITED STATES PATENTS
2,998,719   9/1961   Rubin ................................. 73/167

Primary Examiner—Benjamin A. Borchelt
Assistant Examiner—J. V. Doramus
Attorney—R. S. Sciascia, Roy Miller and Gerald F. Baker

[57] ABSTRACT

A method and apparatus is provided for investigating the effectiveness of explosive warheads by measuring the free air shock generated when hypervelocity fragments from a test warhead impact a target plate.

2 Claims, 2 Drawing Figures

PATENTED NOV 13 1973 3,771,620

INVENTOR.
DONALD W. LOCKWOOD
BY ROY MILLER
ATTORNEY.
GERALD F. BAKER
AGENT.

VAPORIFIC DAMAGE MEASUREMENT ARENA

BACKGROUND OF THE INVENTION

Previous warhead test procedures involved efforts to measure the pressure generated by a warhead in an enclosed volume. Such efforts tended to be complicated and, in many cases, reflected shocks, induced shocks and miscellaneous Mach stems that were present within the enclosed volume rendered the data useless. The vaporific damage mechanism has been recognized for sometime as being a possible source of measurement of warhead effectiveness. Although numerous attempts have been made to both quantitatively and qualitatively measure this vaporific damage mechanism, none have proven very successful. The method and apparatus according to this invention provides a measurement tool by which an absolute value of vaporific potential, as well as the relative effectiveness of competitive warheads, can be determined. Essentially, the method according to the present invention involves the measurement of the free air shock generated when hypervelocity fragments impact a target plate.

DESCRIPTION OF THE INVENTION

Figure 1:
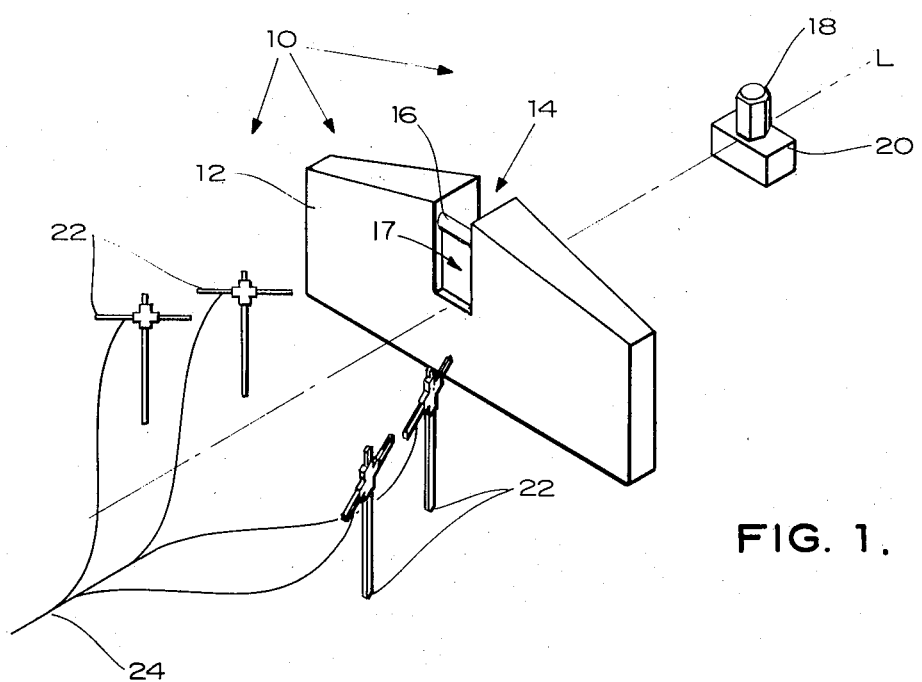
FIG. 1 is a perspective view of a damage measurement arena according to the invention.

The damage measurement arena 10, shown in FIG. 1, is dominated by a barrier wall 12 having a central opening 14. Barrier wall 12 is advantageously made of reinforced concrete and the opening 14 is spanned by a steel pipe 16, the purpose for which will become apparent later in the description. An explosive device 18 is placed on a stand pointing in line with the opening 14 on one side of barrier 12 and a plurality of pressure gauge devices 22 are arranged on the opposite side of barrier 12 from the explosive device.

For each test a sheet 17 of plate steel or other target materials hung on pipe 16 which is close to the gauge side of the opening 14. The sheet 17 of target material is of such size that it approximately closes the opening 14 below pipe 16. The pressure gauges 22 are shown with conduit means 24 for connection to associated recording and readout means. Pressure gauges 22 need not be of any particular form but may be selected from a number of commercially available gauges. Gauges disclosed in U.S. Pat. No. 3,242,718, cited by applicant are typical. Selection and placement of the gauges will be dictated by the circumstances in each test situation.

Figure 2:
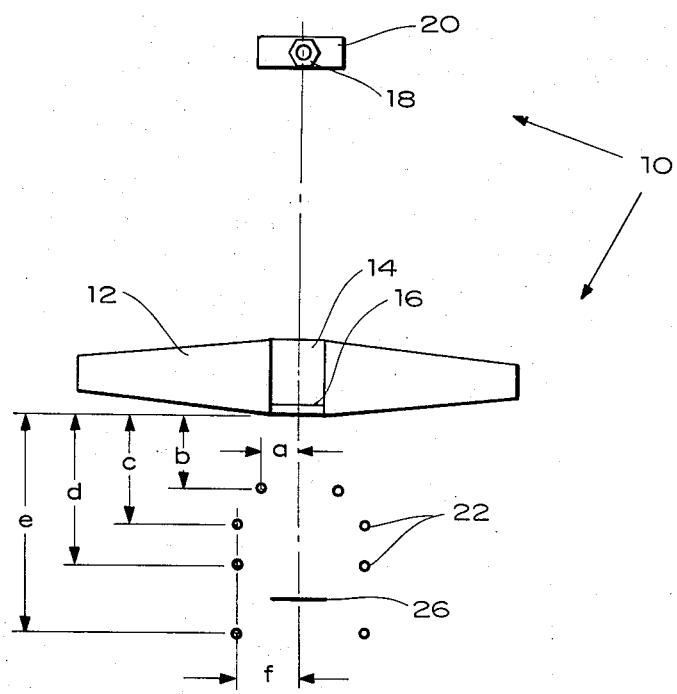
FIG. 2 is an elevational view of the arena of FIG. 1.

As shown in FIG. 2, the gauges are advantageously arranged in a more or less symmetrical pattern in the arena illustrated and, although this arrangement is typical, the arrangement may be readily altered to suit individual needs. If desired, one or more witness plates 26 may be placed on line but are necessary to the vaporific damage test.

The purpose of the arena arrangement shown is to investigate the effectiveness of warheads by measuring the free air shock generated when hypervelocity fragments from a test warhead impact a target plate. The test device illustrated is a linear shaped charge warhead and the warhead is oriented with respect to opening 14 such that one of the jet patterns eminating from the warhead will penetrate the target plate 17 which is hung from pipe 16. When the hypervelocity fragments strike the target plate and emerge on the other side, a vaporific shock is generated. In an ideal situation, a clean free air shock can be recorded by (1) achieving the proper placement of the pressure transducers (2) selecting the target material and (3) determining the warhead standoff.

Under the above conditions the measurements provided by the pressure transducers should provide a quantitative value of the vaporific potential of the warhead and this measurement may be related directly to potential target damage.

What is claimed is:

1. An arena for the investigation of the vaporific damage mechanism as a measure of warhead effectiveness comprising:

a relatively massive and thick upstanding abutment means, of relatively impenetrable material having a centrally located aperture;

an impact target plate pivotally hanging flush with one side of said aperture;

a multiple array of pressure sensing means symmetrically spaced from said abutment on said one side of said aperture; and means spaced from the other side of said abutment means for positioning a warhead for testing;

said abutment means and said positioning means being so constructed and arranged that when a warhead is detonated on said positioning means, the explosive shock wave will be deflected by said abutment means and, thus prevented from affecting said pressure sensing means and said sensing means will, therefore, be substantially solely affected by pressure waves caused when particles from said warhead penetrate said target plate.

2. The arena of claim 1 wherein said sensing means are arranged in pairs at varying distances from said abutment and the sensing means in each pair are arranged equidistant on each side of a center line passing through said aperture and said explosive device.

* * * * *